(No Model.) 3 Sheets—Sheet 1.
T. WEBB.
SWEAT BAND FOR HATS.
No. 456,785. Patented July 28, 1891.
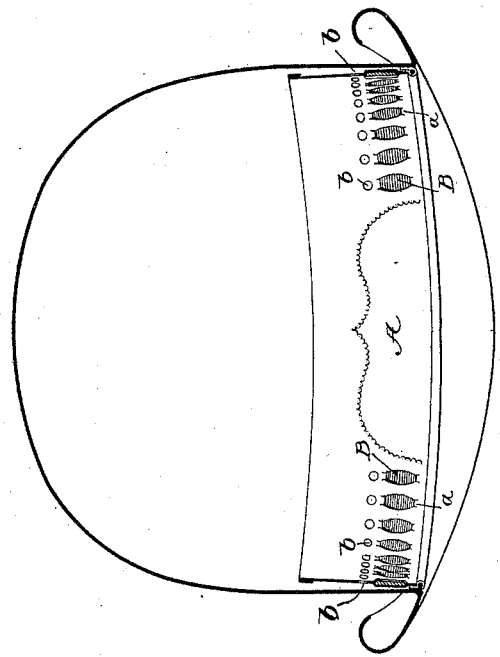
Fig. 1.
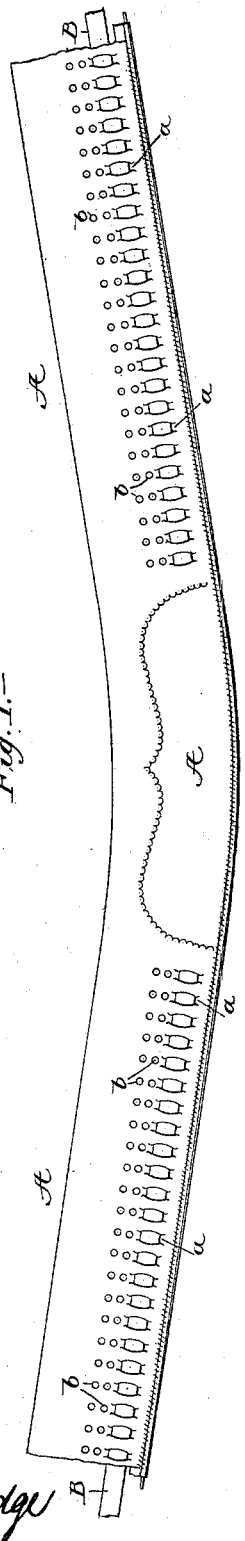
Fig. 1ª.
Witnesses:
William W. Mortimer
Fabius P. Elmore
Inventor:
Thomas Webb
By his Atty.
Philip T. Dodge (No Model.)   3 Sheets—Sheet 2.
T. WEBB.
SWEAT BAND FOR HATS.
No. 456,785.   Patented July 28, 1891.
Fig. 2.   Fig. 4.
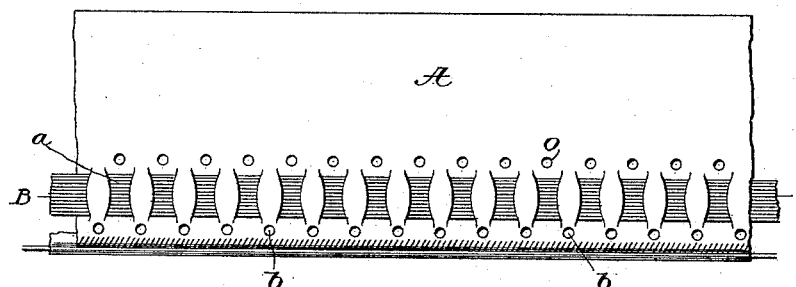 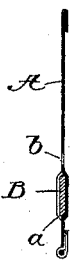
Fig. 3.
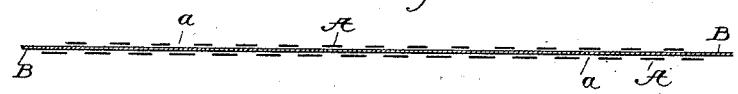
Fig. 5.   Fig. 7.
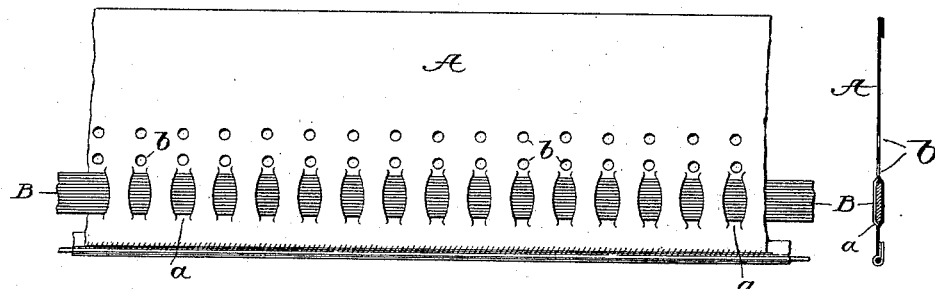
Fig. 6.
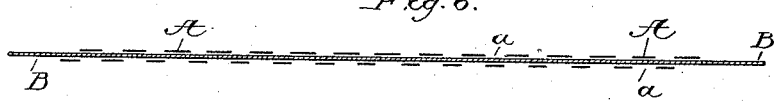 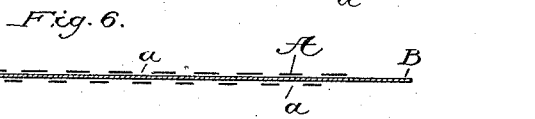
Witnesses:
William W. Mortimer
Fabius P. Elmer
Inventor:
Thomas Webb
By his Atty
Phil T. Dodge (No Model.) 3 Sheets—Sheet 3.
T. WEBB.
SWEAT BAND FOR HATS.
No. 456,785. Patented July 28, 1891.
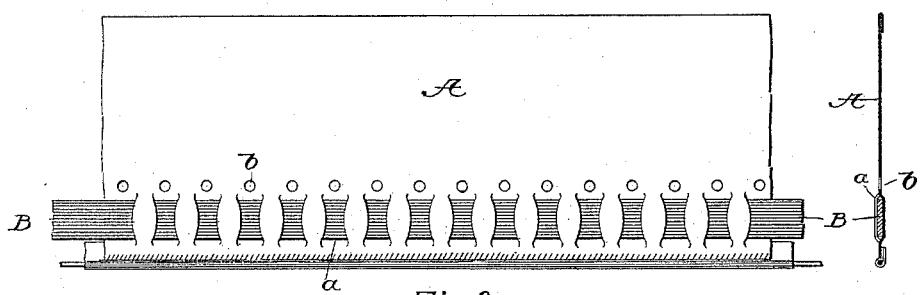
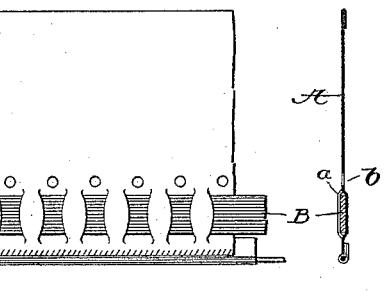
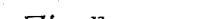
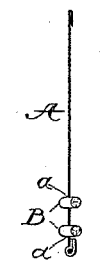
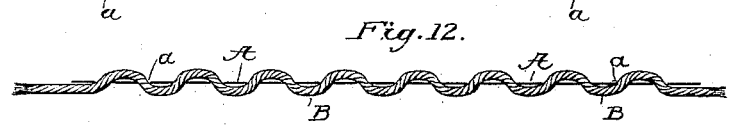
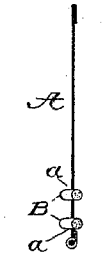
Witnesses:
N. W. Mortimer
Fabius J. Elmer
Inventor:
Thomas Webb
By Phil. T. Dodge Atty

UNITED STATES PATENT OFFICE.

THOMAS WEBB, OF STOCKPORT, ENGLAND.

SWEAT-BAND FOR HATS.

SPECIFICATION forming part of Letters Patent No. 456,785, dated July 28, 1891.

Application filed September 8, 1890. Serial No. 364,374. (No model.)

*To all whom it may concern:*

Be it known that I, THOMAS WEBB, a subject of the Queen of Great Britain, residing at Stockport, in the county of Chester, England, have invented certain new and useful Improvements in Sweat-Bands for Hats, of which the following is a full, clear, and exact description.

The object of the invention is to provide for the better ventilation of the crown or interior of the hats and caps and at the same time secure an ornamental effect on the leather and render the same comfortable to the wearer.

The invention consists, essentially, in a sweat-band provided near its lower or wearing edge—that is to say, the edge which is attached to the hat-body and bears against the head of the wearer—with a series of incisions or openings, and in passing through said incisions from front to back alternately a strip of felt or other pliable material, such as leather or a woven fabric, whereby those portions of the leather lying between the slits are forced alternately inward and outward, so as to leave between them channels or passages through which the air may pass. It will be understood that channels are thus formed on the inner and outer surfaces of the sweat-band, so that the air may enter the hat not only between the head of the wearer and the band, but also between the outside of the band and the body of the hat. In order that the air may have free access to the channels in the outside of the band, I usually provide the lower edge of the band with a series of perforations.

In the accompanying drawings sweat-bands of various forms are illustrated, constructed in accordance with my invention. In each of the figures the band is shown in an inverted position, the edge which is to be stitched to the hat being shown uppermost.

In the drawings, Figure 1 is a vertical cross-section of a hat containing my improved band. Fig. 1ª is a front elevation of a sweat-band provided with my ventilator. Fig. 2 is an elevation on a larger scale of a portion of a band with double air-holes above the inserted strip. Fig. 3 is a horizontal section of the same. Fig. 4 is a vertical cross-section of the same. Fig. 5 is an elevation of a part of a sweat-band with air-holes both above and below the inserted strip. Fig. 6 is a horizontal section of Fig. 5 on the line of the insertion. Fig. 7 is a vertical cross-section of the same. Fig. 8 is an elevation of a part of a band with single air-holes above the serrated strip. Figs. 9 and 10 are horizontal and vertical sections of the same. Fig. 11 is an elevation of a part of a sweat-band, showing two narrow inserted cords or bands in place of the single band shown in the preceding figures. Figs. 12 and 13 are respectively a horizontal and a vertical cross-section of the band shown in Fig. 11. Fig. 14 is an elevation of a part of a sweat-band similar to that shown in Fig. 11, with air-holes above the inserted strip. Figs. 15 and 16 are respectively a horizontal section and a vertical cross-section of the same.

In carrying my invention into effect I provide the leather sweat-band A, which may be in other respects of ordinary construction, with a series of slits or holes $a$, adjusted along its length near the lower edge—that is to say, near the edge which is to be attached to the hat at the junction of the brim and crown. Through these slits or openings I insert or interlace a strip or strips of felt or other material B, which is intended to, and in practice does, retain a straight or practically straight form. The effect of thus introducing the strip is to force those portions of the leather which lie between the successive incisions alternately outward and inward beyond the surfaces of the band, so that there will be on each surface of the band between the raised portions of the leather a series of channels or passages through which air may ascend into the hat. It is to be observed that the ventilating channels or passages of my band lie vertically in their inner and outer faces, and that they are due solely to the fact that the longitudinally-inserted strip possesses sufficient rigidity to raise those portions between the channels above the general surface of the leather.

As shown in Figs. 1 to 10, the inserted strip B is of flat form, while in Figs. 11 to 16 it is of round form, laced through two series of holes or perforations $a$. When of round form, the insertion is preferably a thick thread of yarn or wool.

It is to be observed that the inserted strip is not in itself a ventilator, but that it is merely a means of raising the surfaces of the leather on the inner and outer sides in such manner as to produce channels or passages through which the air may ascend past the inner and outer surfaces of the sweat-band.

In addition to the hats, I sometimes punch one or more rows of holes $b$ through the band A above or below the insertion B, thereby permitting the air to pass through the band and facilitating its entrance into the body of the hat. If the holes B are punched close to the lower edge of the line, they permit the air to pass from the exterior through the band to its back and thence upward through the outside channels between the band and the hat-body.

The slits may be of any ornamental form or configuration desired, so that when the inserted material B is put in place the appearance of the hat is improved. As a rule the slits and the insertion are not to be carried entirely around the band. I prefer to cut away a portion of the leather where it comes in contact with the forehead and substitute therefor a piece of felt or other material, or I may corrugate this portion of the lining.

Having thus described my invention, what I claim is—

1. A sweat-band for a hat, provided in its lower edge with a series of slits, in combination with a strip of pliable material woven therethrough, whereby portions of the leather are elevated above the general surface and intermediate ventilating channels thereby formed.

2. A sweat-band for a hat, provided in its lower edge with a series of slits and with a strip of pliable material woven therethrough to produce air-channels in the inner and outer surfaces, and also provided with openings $b$ through the lower edge that air may pass through the channels in both the inner and the outer faces of the band.

In testimony whereof I have signed my name to this specification in the presence of two subscribing witnesses.

THOMAS WEBB.

Witnesses:
J. OWDEN O'BRIEN,
WILLIAM H. TAYLOR.